(12) United States Patent
Homola et al.

(10) Patent No.: US 9,123,373 B1
(45) Date of Patent: Sep. 1, 2015

(54) ELECTROCHEMICAL ETCHING OF MAGNETIC RECORDING LAYER

(71) Applicant: WD Media, LLC, San Jose, CA (US)

(72) Inventors: Andrew M. Homola, Naples, FL (US); Chunbin Zhang, Fremont, CA (US); Paul C. Dorsey, Los Altos, CA (US); David Treves, Palo Alto, CA (US)

(73) Assignee: Western Digital Media, LLC, San Jose, CA (US)

( * ) Notice: Subject to any disclaimer, the term of this patent is extended or adjusted under 35 U.S.C. 154(b) by 38 days.

(21) Appl. No.: 13/928,145

(22) Filed: Jun. 26, 2013

Related U.S. Application Data

(62) Division of application No. 12/547,444, filed on Aug. 25, 2009, now Pat. No. 8,492,009.

(51) Int. Cl.
*C25F 3/02* (2006.01)
*C25F 3/14* (2006.01)
*G11B 5/84* (2006.01)

(52) U.S. Cl.
CPC ... *G11B 5/84* (2013.01); *C25F 3/02* (2013.01); *C25F 3/14* (2013.01)

(58) Field of Classification Search
CPC .............. B23H 2300/12; C25F 3/00–3/02; G11B 5/66; G11B 5/656; G11B 5/667; G11B 5/65
USPC ................................. 205/640–686
See application file for complete search history.

(56) References Cited

U.S. PATENT DOCUMENTS

| | | | |
|---|---|---|---|
| 4,454,014 A * | 6/1984 | Bischoff | 428/611 |
| 5,378,330 A * | 1/1995 | Li et al. | 205/661 |
| 6,245,213 B1 | 6/2001 | Olsson et al. | |
| 6,402,931 B1 | 6/2002 | Zhou et al. | |
| 6,783,657 B2 | 8/2004 | Marsh et al. | |
| 6,811,680 B2 * | 11/2004 | Chen et al. | 205/662 |
| 7,022,216 B2 | 4/2006 | Taylor et al. | |
| 7,186,656 B2 | 3/2007 | Sreenivasan | |
| 7,256,131 B2 | 8/2007 | LaBrake | |
| 7,341,825 B2 | 3/2008 | Bandic et al. | |
| 7,409,759 B2 | 8/2008 | Sewell | |
| 8,492,009 B1 | 7/2013 | Homola et al. | |
| 2004/0074783 A1 * | 4/2004 | MacDonald et al. | 205/674 |
| 2006/0006135 A1 | 1/2006 | Homola et al. | |
| 2006/0124585 A1 | 6/2006 | Suwa et al. | |
| 2006/0207889 A1 | 9/2006 | Staud | |
| 2006/0207890 A1 | 9/2006 | Staud | |
| 2006/0222898 A1 * | 10/2006 | Ichihara | 428/826 |
| 2006/0275692 A1 | 12/2006 | Okawa et al. | |
| 2007/0000861 A1 | 1/2007 | Kamata et al. | |
| 2007/0146932 A1 | 6/2007 | Nikitin | |
| 2008/0078739 A1 | 4/2008 | Hibi et al. | |

(Continued)

OTHER PUBLICATIONS

Hattori et al., "Fabrication of Discrete Track Perpendicular Media for High Recording Density", IEEE Transactions on Magnetics, vol. 40, No. 4, pp. 2510-2515, Jul. 2004.

Terris et al., "Nanofabricated and Self-assembled Magnetic Structures as Data Storage Media," Journal of Physics D: Applied Physics, 38, R199-R222, 2005.

Kikitsu, et al., "Recent Progress of Patterned Media," IEEE Transactions on Magnetics, vol. 43, No. 9, pp. 3685-3688, Sep. 2007.

(Continued)

*Primary Examiner* — Nicholas A Smith
*Assistant Examiner* — Brian W Cohen

(57) ABSTRACT

A method of fabricating a perpendicular magnetic recording disk is described. The method may include providing a magnetic recording layer disposed above a substrate with a plurality of intermediate layers disposed there between and electrochemically etching the magnetic recording layer.

17 Claims, 9 Drawing Sheets

(56) References Cited

U.S. PATENT DOCUMENTS

2008/0187719 A1  8/2008  Uchida
2009/0139875 A1* 6/2009  Kim et al. .................... 205/684
2010/0273026 A1  10/2010 Riemer et al.

OTHER PUBLICATIONS

Hoare, "Electrolytic Machining Methods", Kirk-Othmer Concise Encyclopedia of Chemical Technology, John Wiley & Sons, 1985.

* cited by examiner

ELECTROCHEMICAL ETCHING OF MAGNETIC RECORDING LAYER

RELATED APPLICATION

This application is a divisional of U.S. patent application Ser. No. 12/547,444, filed Aug. 25, 2009, which is hereby incorporated by reference in its entirety.

TECHNICAL FIELD

Embodiments described herein relate to the field of patterned media, and, in particularly, to electrochemical etching of a magnetic recording layer.

BACKGROUND

One type of discrete track media (DTM) structure utilizes a pattern of concentric discrete zones for the recording medium. When data are written to the recoding medium, the discrete magnetic areas correspond to the data tracks. The disk areas not containing the magnetic material isolate the data tracks from one another. The discrete magnetic zones (also known as raised areas, hills, lands, elevations, etc.) are used for storing data and the non-magnetic zones (also known as recessed areas, troughs, valleys, grooves, etc.) provide inter-track isolation to reduce noise. The lands may have a width less than the width of the recording head such that portions of the head extend over the troughs during operation. The lands are sufficiently close to the head to enable the writing of data in the magnetic layer. Therefore, with DTM, data tracks are defined both physically and magnetically.

One conventional way of fabricating DTM is to etch the magnetic layers of current perpendicular magnetic recording (PMR) media to generate the grooves and lands structure. In the etching process, the grooves will lose their magnetic property when the etching removes the magnetic components. The challenge associated with etching the magnetic alloys is that the etching process should be low cost (cost-effective) and fast (high throughput) in order to have cost effective fabrication for commercial applications. Commonly used etching techniques include reactive ion etching, focused ion beam, and ion milling (or sputter). However, these etching methods may suffer from cost inefficiencies due to the high operating costs associated with the requirements of operating inside a vacuum, use of multiple masks and slow throughput.

Electrochemical etching or electroetching has been used widely in the etching of metals in different industries such as optical storage media, printed circuit boards, integrated circuits, and semiconductors. However, electrochemical etching or electroetching method have generally not been used in the fabrication of magnetic recording disks other than for etching of substrates due to problems thought associated with electrochemical etching of layers of a magnetic recording disk. For example, the perceived problems associated with etching perpendicular magnetic alloys using conventional methods are caused by the magnetic composition and structure of the magnetic recording layer. Perpendicular magnetic alloys contain platinum, chromium, and other elements besides cobalt or iron. Metals like platinum and chromium tend to form precipitate under wide range conditions. The electrolytes used in some conventional chemical etching processes contain strong acids or oxidizing agents such as HCl, H2SO4, HNO3 which may be incompatible with magnetic alloys as they may cause corrosion problems and other fabrication problems for DTM disks.

BRIEF DESCRIPTION OF THE DRAWINGS

The present invention is illustrated by way of example, and not limitation, in the figures of the accompanying drawings in which.

DETAILED DESCRIPTION

Embodiments of a method are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Embodiments of a method of fabricating a perpendicular magnetic recording disk by electrochemically etching a magnetic recording layer and resulting perpendicular magnetic recording disk structure are described. In one embodiment, the method may include electrochemically etching the magnetic recording layer using a chelating agent. In another embodiment, a particular waveform of potential (e.g., voltage) may be used to control the electrochemical etching process. In one particular embodiment, the use of chelating agent in combination with a particular waveform may be effective in reducing, or eliminating, the magnetic property of the disk raised areas without causing detrimental effects such as corrosion on the magnetic media under certain selected etching conditions such as pH, voltage, temperature, etc.

Figure 1:
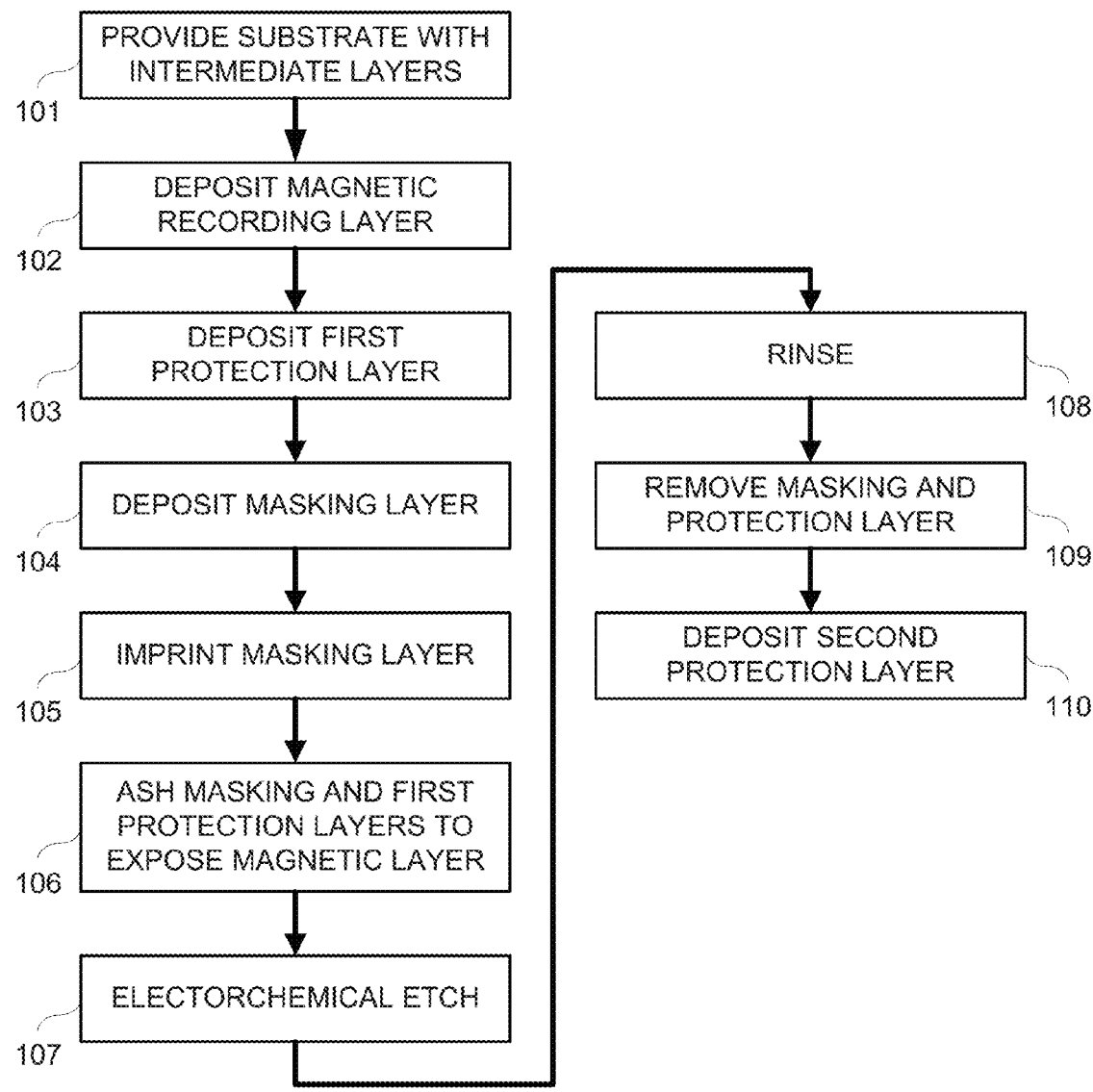
FIG. 1 illustrates the fabrication of a DTM perpendicular magnetic recording disk according to one embodiment of the present invention.
Figure 2A:
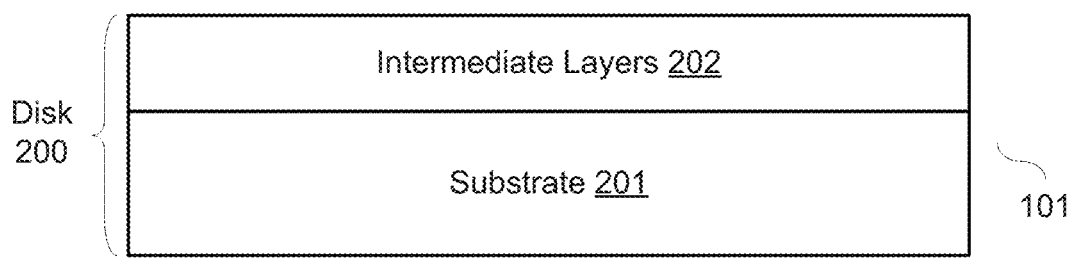
FIG. 2A through FIG. 2I illustrate cross sectional views of the resulting disk structure after the manufacturing operations according to one embodiment of the present invention.
Figure 2B:
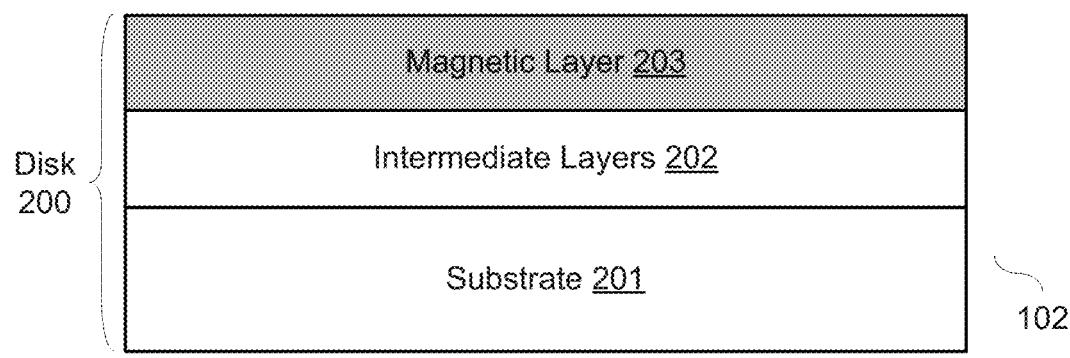
Figure 2C:
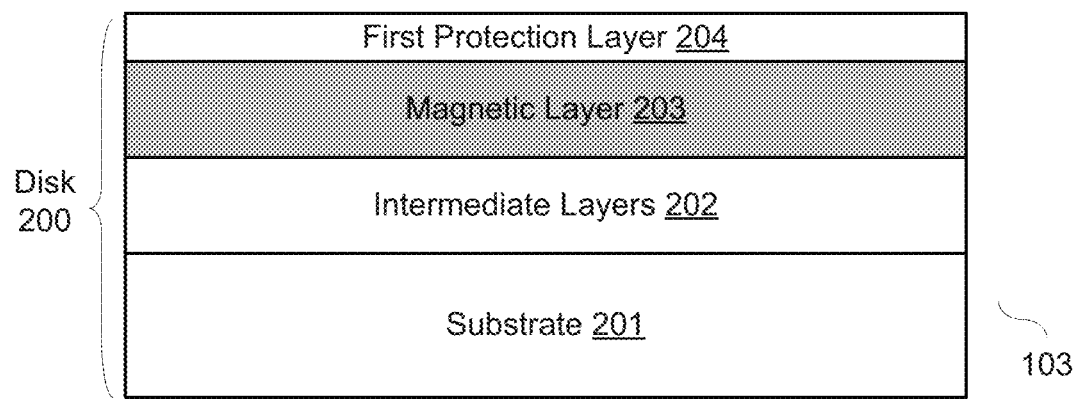
Figure 2D:
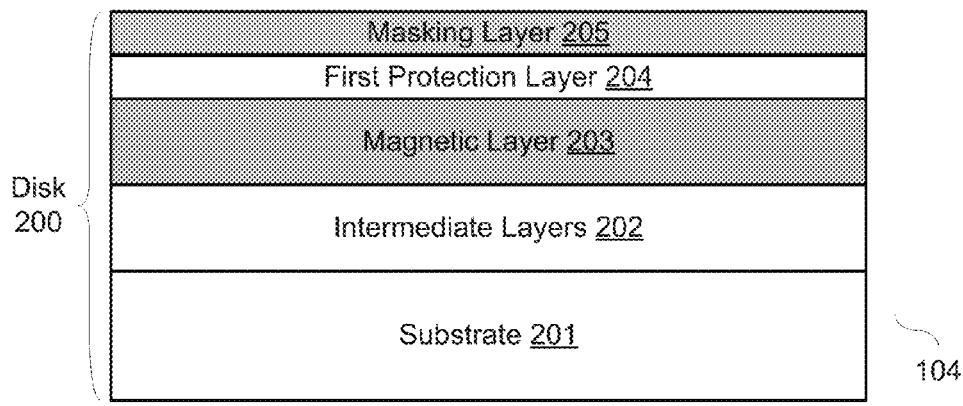
Figure 2E:
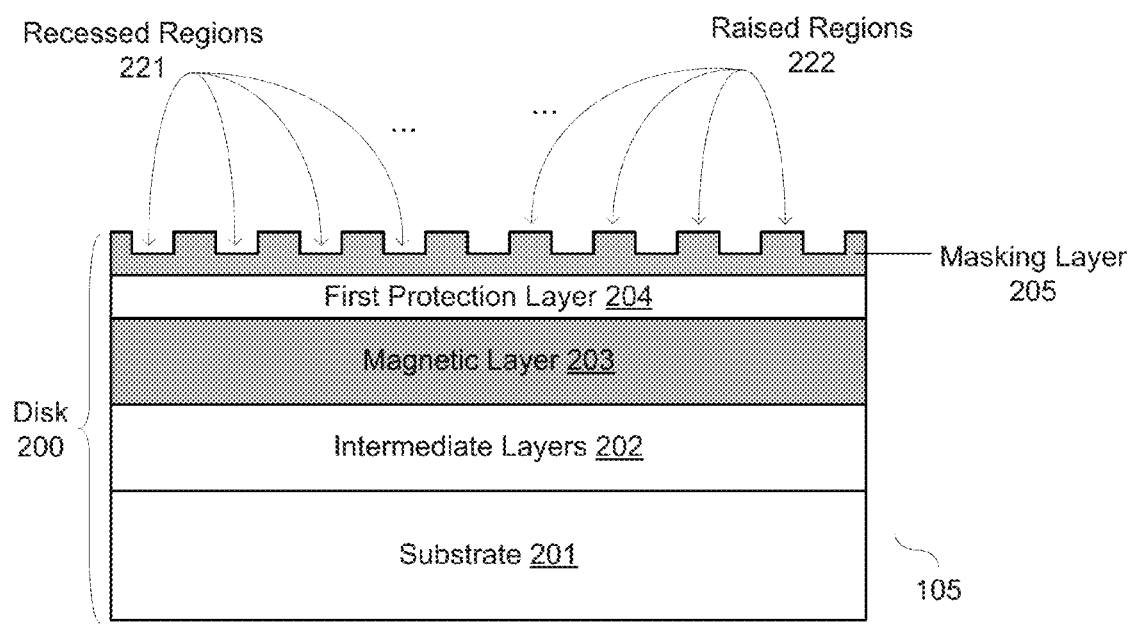
Figure 2F:
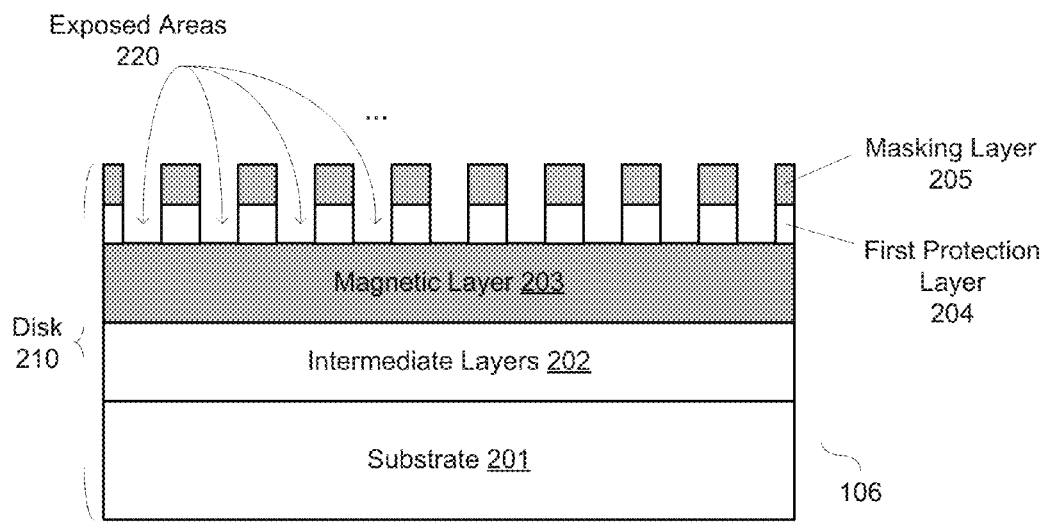
Figure 2G:
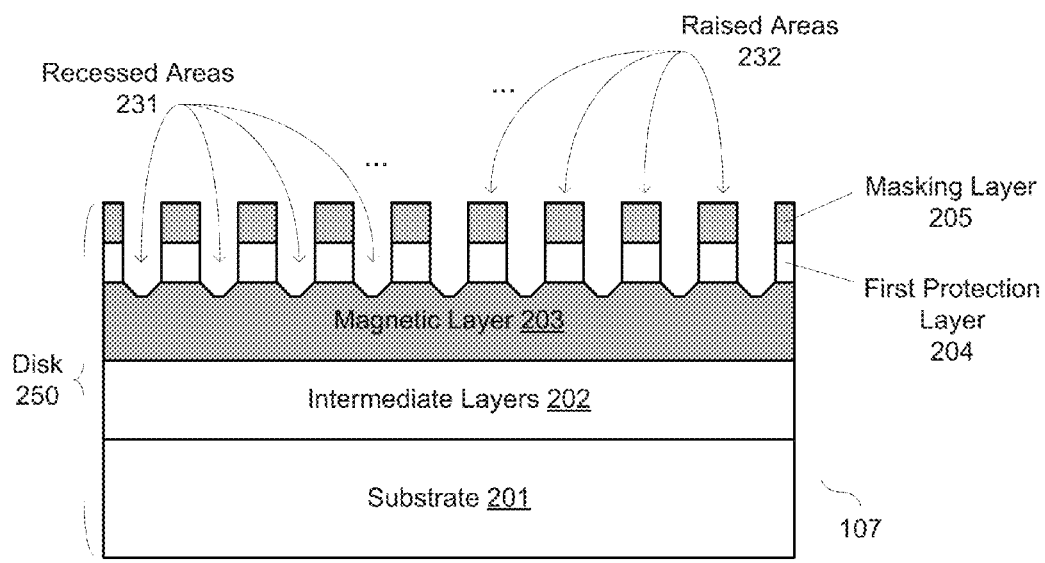
Figure 2H:
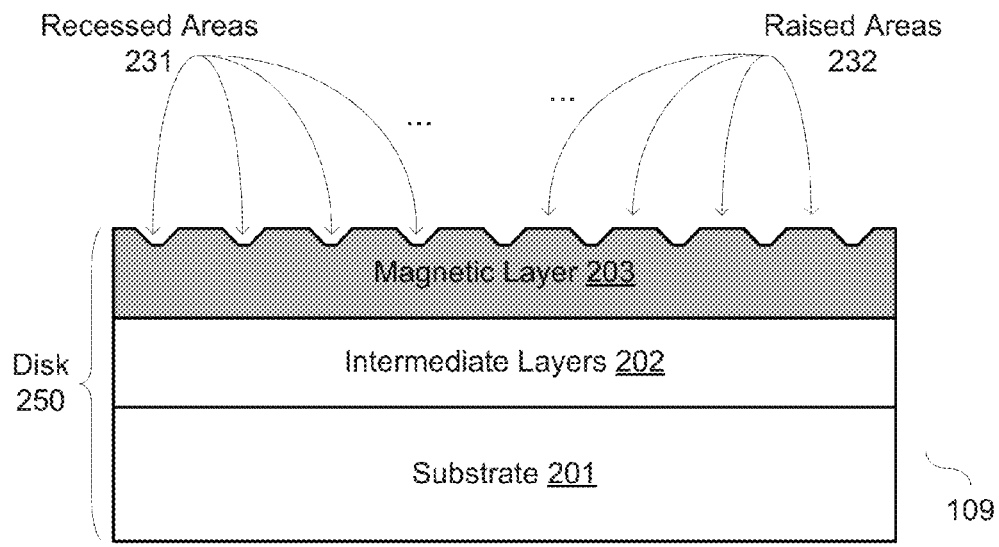
Figure 2I:
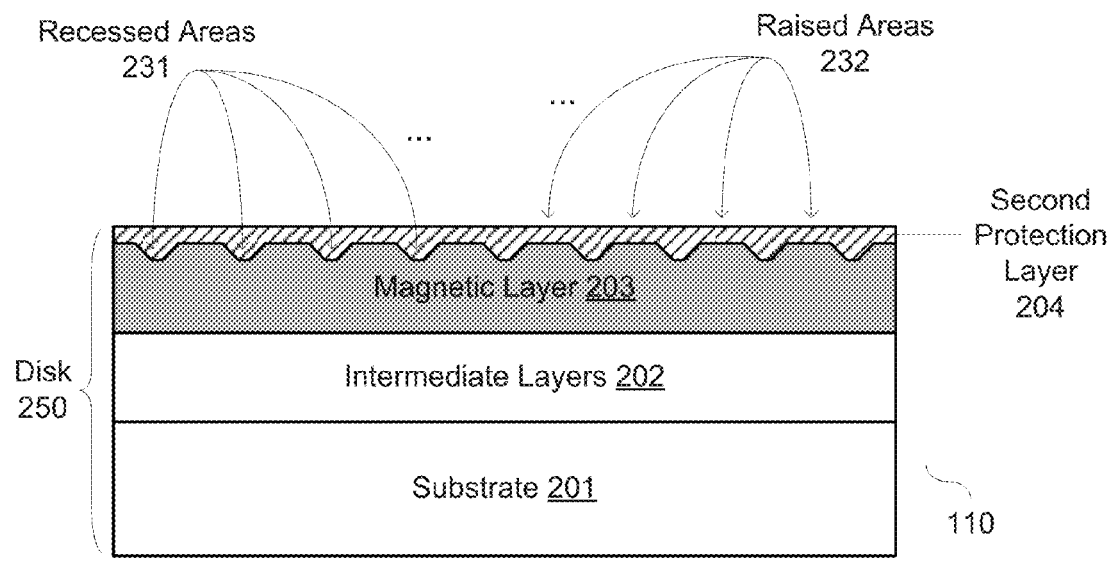
Figure 3:
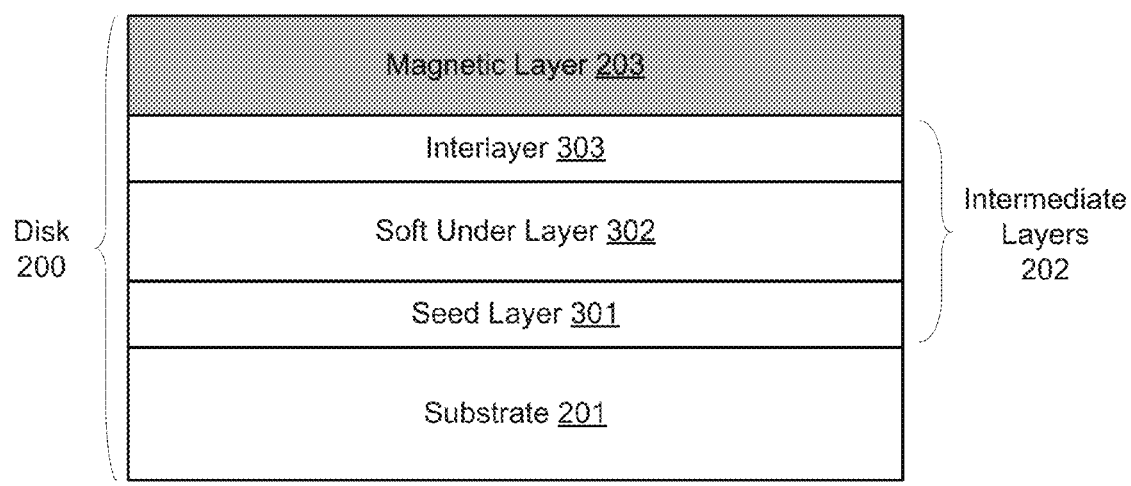
FIG. 3 illustrates one exemplary embodiment of the intermediate layers of a perpendicular magnetic recording disk.

FIG. 1 illustrates one embodiment of the manufacturing operations to fabricate a DTM perpendicular magnetic recording disk. FIGS. 2A through 2I illustrate the cross sectional views of the resulting disk structure after each operation. FIG. 3 illustrates one exemplary embodiment of the intermediate layers of a perpendicular magnetic recording disk. For clarity of explanation, the various layers illustrated in FIGS. 2A through 2I and FIG. 3 are exemplary and may not be scaled to representative sizes. Furthermore, additional or intervening layers that are not shown may be present in alternative embodiments. Methods of layer deposition in magnetic recording disk manufacturing are well known in the art and thus, are not described in particular details.

In one embodiment, the manufacturing operations to fabricate a perpendicular magnetic recording disk 200 may start with a disk substrate 201 in operation 101. The substrate 201 may be composed of, for example, a metal, metal alloys such as nickel phosphorous (NiP), glass, or other substrate materials known in the art including polymers and ceramics. The substrate 201 may also have a plurality of intermediate layers 202 disposed above the substrate 201 as shown in FIG. 2A. In one exemplary embodiment, as illustrated in FIG. 3, the plurality of intermediate layers 202 may include a seed layer 301, a soft under layer 302, and an interlayer 303. The seed layer 301 may be made of, for example, chromium (Cr). The interlayer 303 may be made of, for example, ruthenium (Ru). In alternative embodiments, the intermediate layers 202 may have other compositions and additional intervening layers such as pinning layers and spacer layers.

In operation 102, a magnetic recording layer 203 is then deposited above the substrate 201 and the plurality of intermediate layers 202. FIG. 2B illustrates one example of the resulting disk 200 structure after operation 102. The magnetic recording layer 203 may compose of magnetic alloys made of cobalt (Co), platinum (Pt), and other elements including Cr. In alternative embodiments, the magnetic recording layer 203 may be compose of other magnetic alloys.

A first protection layer 204 is then deposited above the magnetic recording layer 203 in operation 103. In one embodiment, the first protection layer 204 may be a carbon layer. A masking layer 205 is then deposited above the first protection layer 204 in operation 104. The masking layer 205 may be a resist or other embossable layer material that serves as a mask for the desired pattern during the etching process in operation 107. The masking layer 205 may then be imprinted with a desired pattern in operation 105. A stamper (a.k.a., imprinter or embossing foil) may then be used to imprint the masking layer 205 to form an initial pattern of raised regions 222 and recessed regions 221. The recessed regions 221 may then undergo a plasma ashing process in operation 106 to remove portions of the masking layer 205 and the first protection layer 204 in the recessed regions 221 to expose the magnetic recording layer 203. Examples of the resulting disk 200 structure after these operations are shown in FIGS. 2C through 2F.

After removal of the masking layer 205 and the first protection layer 204 from the recessed regions 221, the resulting intermediate disk structure to be etched (hereinafter "disk 210") may then undergo an electrochemical etching process in operation 107 to etch away the magnetic components in the exposed areas 220 of the magnetic recording layer 203. In one embodiment, the etching process in operation 107, as described in more details below, removes metal from the magnetic alloy in the exposed areas 220 of the magnetic recording layer 203. After the etching operation 107, the etched disk 250 structure may have a cobalt-to-platinum (Co/Pt) ratio in the recessed areas 231 less than a Co/Pt ratio in the raised areas 232 effecting removal of magnetic properties in the recessed areas 231. This creates a patterned topography, as illustrated in FIG. 2G, on the surface of the disk 250 to form magnetic recording tracks along the raised areas 232 where the magnetic properties are maintained. Separation between tracks is provided by the recessed areas 231 where the magnetic properties have been etched away in operation 107. In one embodiment, the raised areas 232 may be about 150 nanometers (nm) wide, and the recessed areas 231 may be about 66 nm wide. Alternatively, the raised areas 232 and recessed areas 231 may have other dimensions in other embodiments.

In alternative embodiments, the etched disk 250 may be rinsed in operation 108 after the etching operation 107 to remove residues from the etching process. The remaining masking layer 205 and first protection layer 204 may also be removed in operation 109. FIG. 2H shows one example of the etched disk 250 structure after operation 109. Another protection layer 206 may then be deposited over the etched disk 250 in operation 110 to protect the resulting disk topography. An example of the resulting perpendicular magnetic recording disk 250 structure is shown in FIG. 2I.

Figure 4:
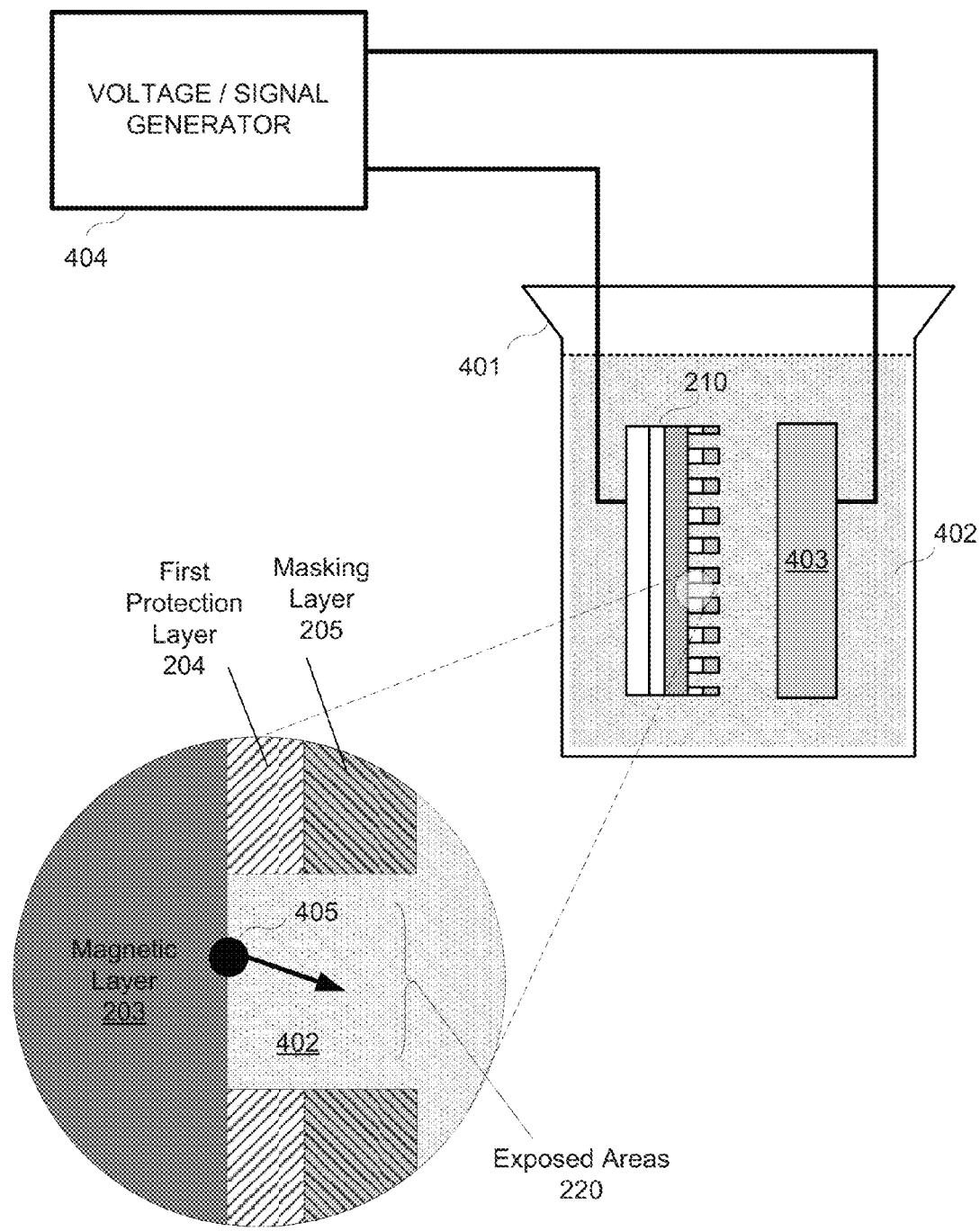
FIG. 4 illustrates an electrochemical bath for carrying out one embodiment of an etching process of the present invention.

FIG. 4 shows one embodiment of an electrochemical bath 401 for carrying out the etching process in operation 107. In this embodiment, the disk 210 to be etched is used as the working electrode (anode during etching). The disk 210 is immersed in the electrochemical bath 401 containing an electrolyte solution 402. In one embodiment, a counter-electrode 403 (cathode during etching) may be immersed into the bath 401 adjacent to the disk 210. The counter-electrode 403 may be a disk which is coated with relatively inert and conductive metal such as gold. The disk 210 and the counter-electrode 403 may be aligned parallel to each other with a certain spacing distance. In one embodiment, the spacing may be about 6 millimeters (mm). Different spacing distances may be used in other embodiments. The disk 210 and the counter-electrode 403 may be connected to a voltage signal generator 404 or an electrical power source that can supply different waveforms of potential or current to induce an electrical voltage (potential) across the disk 210 and the counter-electrode 403 to remove metal from the exposed areas of the magnetic recording layer 203 of the disk 210.

In one embodiment, the electrolyte solution 402 may include a chelating agent. The chelating agent may be, for example, citric acid (also known as 3-hydroxypentanedioic acid-3-carboxylic acid). In another embodiment, the chelating agent may include an ethylenediaminetetraacetic acid (EDTA). In alternative embodiments, the chelating agent may be any one of, but not limited to, phosphonate, malic acid, oxalic acid, polar amino acid, succinic acid, ascorbic acid, dicarboxymethylglutamic acid, gluconate, tartrate, glycine, pyridine and imidazole derivatives. In other embodiments, the electrolyte solution 402 may be made of a combination of different chelating agents. Surfactants, bases, corrosion inhibitors, and other acids may be added to effect lower surface energy, pH values, or other properties. Additives such as carriers, levelers, and brighteners may also be included in the electrolyte solution.

The use of chelating agents as electrolytes may have one or more advantages. The use of some chelating agents may be environmentally friendly. Some chelating agents may also function (carry metal ions away from the disk) at milder pH conditions, or even around a pH of 7, thus preventing PMR disks from the corroding action of typical electrolyte solutions.

Typical magnetic alloys may be made of cobalt (Co), platinum (Pt), chromium (Cr), and other minor elements. Pt and Cr ions may not be very soluble in milder pH conditions. Hence, to etch the magnetic layer 203 by dissolving Pt and Cr ions may require extremely strong acids. However, the nature of PMR disks limits the use of strong acids as they present detrimental effects to the disks.

On the other hand, Co may be relatively electrochemically active and dissolves in milder pH conditions. In one embodiment, the use of a chelating agent or a plurality of chelating agents in the electrolyte solution 402 may facilitate the formation of cobalt metal ion complexes 405 on the surface of the exposed areas 220 of the magnetic recording layer 203. These ion complexes 405 may then be carried away from the surface of the magnetic recording layer 203 in the electric field induced by the voltage signal generator 404 after the metals in the magnetic recording layer 203 have been oxidized or ionized by the electrochemical potential application.

Figure 5:
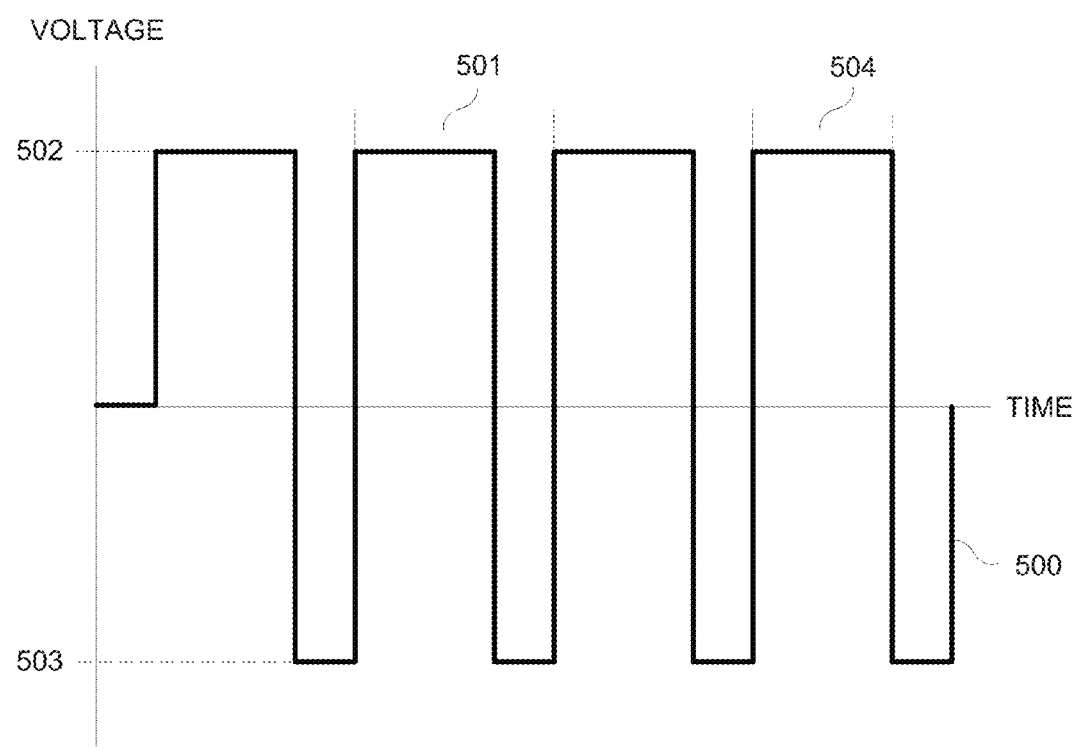
FIG. 5 illustrates one embodiment of a reversely pulsed voltage waveform applied to the electrochemical bath.

In one embodiment, the voltage signal generator 404 supplies a reversely pulsed voltage waveform as shown in FIG. 5. The reversely pulsed voltage waveform may be a square wave 500. In other embodiments, the waveform may also take the form of curves where amplitude changes with time. The reversely pulsed voltage waveform may have a pulse period 501 in a range of 0.1 milliseconds (ms) to 20 ms. The reversely pulsed voltage waveform may have an upper positive voltage 502 in a range of 1.5 volts (V) to 3.5V and a lower negative voltage 503 in a range of −1.5V to −3.5V. The reversely pulsed voltage waveform may further have a positive pulse duty cycle in a range of 20 to 90 percent, where the positive pulse duty cycle is the positive pulse width 504 divided by the pulse period 501. It should be noted that values outside the exemplary ranges provide above may also be used. In an alternative embodiment, the voltage signal generator 404 may supply a constant voltage. In other embodiments, there may be pauses between the positive and negative pulses when no current flows. The waveform may also be a combination of trains of pulses of different periods and amplitudes.

In a particular embodiment, the electrolyte solution 402 may be made of 1% EDTA. Potassium hydroxide (KOH) may be added to adjust the pH of the solution. The disk 210 may be immersed in the electrochemical bath 401 with a temperature of about 50 degrees Centigrade and placed about 6 millimeters (mm) from the counter-electrode 403. In other embodiments, different separation distances may be used. A reversely pulsed square wave with an upper positive voltage 502 of 3.5V and a lower negative voltage 503 of −3.5V, a positive pulse duty cycle of 70 percent, and a pulse period 501 of 5 ms may be applied across the disk 210 and the counter-electrode 403 for 15 seconds with the electrochemical bath 401 under constant agitation. In alternative embodiments, the electrochemical bath 401 may have a temperature in a range of 40 to 60 degrees Centigrade.

The extent of the etching (effective reduction or elimination of magnetic property in the recessed areas) can be expressed as a cobalt-to-platinum (Co/Pt) ratio if Pt is not removed during the etching. Alternatively, the extent of etching can also be more generally expressed as the percentage of Co removal (as compared with original Co content). After the etching operation 107, the Co/Pt ratio under the recessed areas 231 may decrease in a direction towards the center of the recessed areas 231. In one embodiment, the Co/Pt ratio may decrease by at least a factor of two in the center of the recessed areas 231 relative to the Co/Pt ratio in the raised areas 232. In another embodiment, the Co/Pt ratio in the center of the recessed areas 231 may be less than 0.5 after the etching. Alternatively, the etching may remove more than 50% of the Co in the center of the recessed areas 231.

Figure 6:
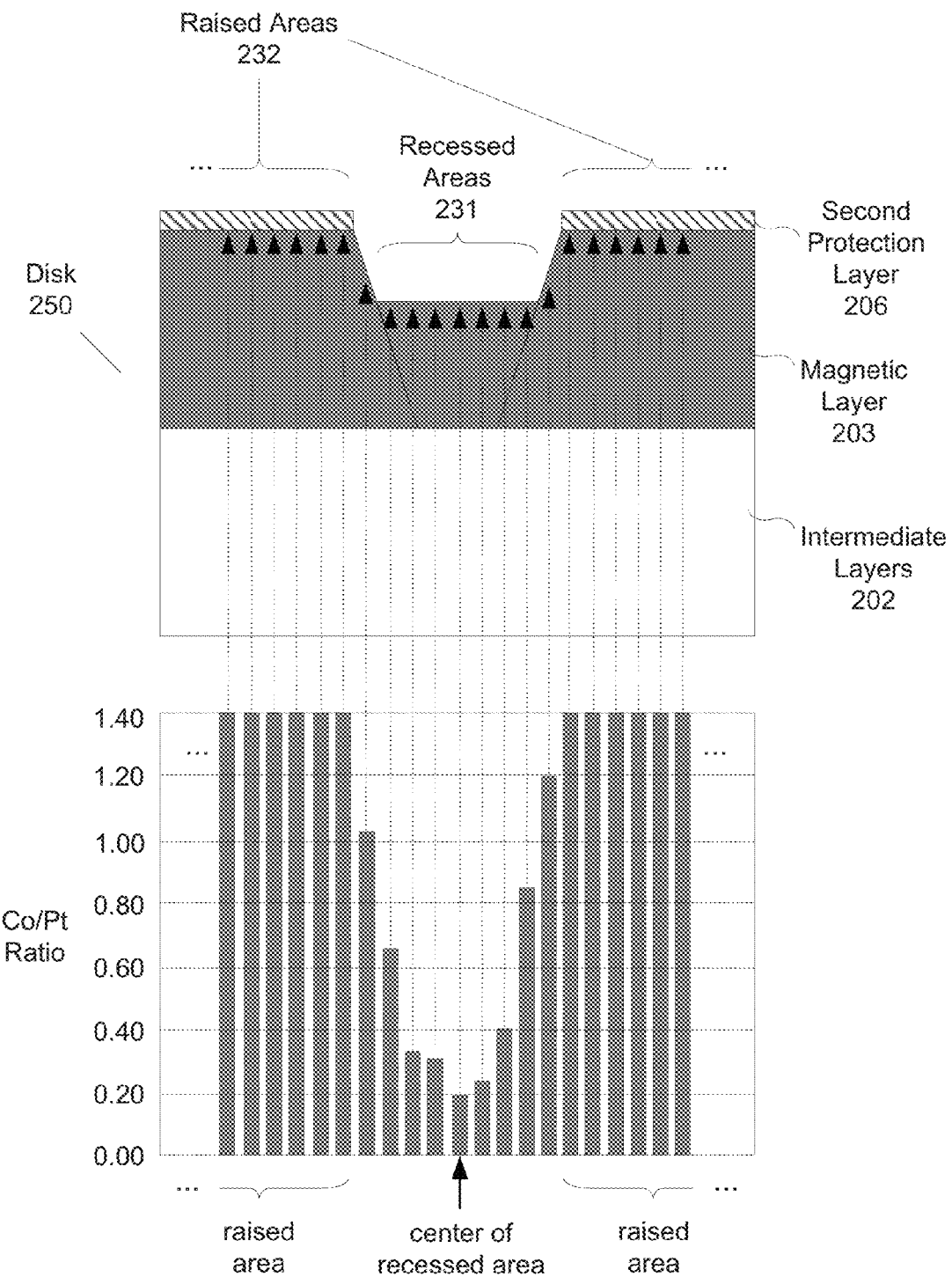
FIG. 6 illustrates a cross sectional view of the structure of a magnetic recording media disk according to one embodiment of the present invention.

FIG. 6 illustrates an example of the resulting structure of a magnetic recording media disk 250 according to a particular embodiment and the measured cobalt-to-platinum (Co/Pt) ratios of that structure at various locations around the recessed areas 231 and raised areas 232 of the magnetic recording layer 203. The Co/Pt ratios on the surface of the recessed areas 231 where the electrochemical etching process affected the magnetic recording layer 203 are less than the Co/Pt ratio on the surface of the raised areas 232 where the masking layer 205 and the first protection layer 204 preserved the magnetic recording layer 203. In a particular embodiment, the Co/Pt ratio in center of the recessed areas 231 is less than 0.20, whereas the Co/Pt ratios in the raised areas 232 are above 1.40. Hence, in this particular embodiment, the Co/Pt ratio decreases by a factor of about seven in the center of the recessed areas 231 relative to the Co/Pt ratio in the raised areas 232. This difference in Co/Pt ratio results in a loss of magnetic properties in the recessed areas 231 to form physical and magnetic separations between adjacent tracks of the discrete raised areas 232 of the disk surface to create a perpendicular magnetic recording disk 250.

Embodiments of the methods described above may be used to fabricate a DTM PMR disk. In particular embodiments, both sides of the substrate may be processed, in either simultaneous or consecutive fashion, to form disks with double sided DTR patterns.

The terms "above," "under," "between," and "on" as used herein refer to a relative position of one layer with respect to other layers. As such, for example, one layer deposited or disposed above or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming the initial disk is a starting substrate and the subsequent processing deposits, modifies and removes films from the substrate without consideration of the absolute orientation of the substrate. Thus, a film that is deposited on both sides of a substrate is "over" both sides of the substrate.

In the foregoing specification, the present invention has been described with reference to specific exemplary embodiments thereof. It will, however, be evident that various modifications and changes may be made thereto without departing from the broader scope of the embodiments of the invention as set for in the appended claims. The specification and drawings are, accordingly, to be regarded in an illustrative rather than a restrictive sense.

What is claimed is:

1. A method of fabricating a perpendicular magnetic recording disk, the method comprising:
   providing a magnetic recording layer disposed above a substrate with a plurality of intermediate layers disposed there between of the perpendicular magnetic recording disk; and
   electrochemically etching the magnetic recording layer using a chelating agent to convert the magnetic recording layer into an electrochemically etched magnetic recording layer, the electrochemically etched magnetic recording layer having a first raised area and a first recessed area patterned thereon, the first raised area and the first recessed area being separated by a sidewall, wherein:
   a first region of the first recessed area has a first cobalt-to-platinum (Co/Pt) ratio, the first region being located at a center of the first recessed area,
   a second region of the first recessed area has a second Co/PT ratio, the second region being located adjacent to the first region,
   a third region of the first recessed area has a third Co/Pt ratio, the third region being located between the second region and the first raised region, a fourth region of the first recessed area has a fourth Co/Pt ratio, the fourth region being located between the third region and the first raised area, the first Co/Pt ratio is greater than zero and less than 0.5, and each of the first, second, third, and fourth Co/Pt ratios are different from each other.

2. The method of claim 1, wherein the electrochemical etching of the magnetic recording layer generates a pattern of recessed areas formed therein, the pattern of recessed areas including the first recessed area.

3. The method of claim 1, wherein the chelating agent comprises citric acid.

4. The method of claim 1, wherein electrochemically etching the magnetic recording layer further comprises applying a reversely pulsed voltage waveform to the perpendicular magnetic recording disk while immersed in an electrochemical bath comprising an electrolyte solution.

5. The method of claim 1, wherein the chelating agent comprises ethylenediaminetetraacetic acid (EDTA).

6. The method of claim 1, wherein the chelating agent comprises one of a group consisting of phosphonate, malic acid, oxalic acid, polar amino acid, succinic acid, ascorbic acid, dicarboxymethylglutamic acid, gluconate, tartrate, glycine, pyridine and imidazole derivatives.

7. The method of claim 1, wherein electrochemically etching the magnetic recording layer further comprises applying a reversely pulsed voltage waveform to the perpendicular magnetic recording disk while immersed in an electrochemical bath comprising an electrolyte solution.

8. The method of claim 7, where the waveform is a square wave.

9. The method of claim 8, wherein a pulse period of the waveform is in a range of 0.1 milliseconds (ms) to 20 ms.

10. The method of claim 8, wherein the waveform has an upper positive voltage range from 1.5V to 3.5V and a lower negative voltage range from −1.5V to −3.5V.

11. The method of claim 8, wherein the square wave has a positive pulse with a duty cycle in a range of 20 to 90 percent.

12. The method of claim 8, wherein the square wave has a positive pulse with a 70 percent duty cycle and a 5 millisecond period for 15 seconds.

13. The method of claim 1, wherein electrochemically etching the magnetic recording layer further comprises applying a constant voltage to the perpendicular magnetic recording disk while immersed in an electrochemical bath comprising an electrolyte solution.

14. The method of claim 1, comprising electrochemically etching the magnetic recording layer using a plurality of different chelating agents.

15. The method of claim 1, wherein the electrochemically etching is performed at a bath temperature of in a range of 40 to 60 degrees Centigrade with the chelating agent under constant agitation.

16. The method of claim 1, wherein providing the magnetic recording layer comprises:

depositing the magnetic recording layer above the substrate;

depositing a first protection layer above the magnetic recording layer;

depositing a masking layer above the first protection layer;

imprinting a masking layer; and ashing the masking layer and the first protection layer to expose areas of the magnetic recording layer to be electrochemically etched.

17. The method of claim 16, further comprising:

rinsing the electrochemically etched magnetic recording layer;

removing the masking layer and the first protection layer; and depositing a second protection layer above the magnetic recording layer.

* * * * *